United States Patent Office 3,810,949
Patented May 14, 1974

3,810,949
INTERMOLECULAR ADDITION
Lawrence H. Shepherd, Jr., Baton Rouge, La., assignor to Ethyl Corporation, Richmond, Va.
No Drawing. Continuation-in-part of abandoned application Ser. No. 888,071, Dec. 24, 1969. This application Sept. 25, 1972, Ser. No. 291,647
Int. Cl. C07j 3/02
U.S. Cl. 260—665 G — 51 Claims

ABSTRACT OF THE DISCLOSURE

Hydrocarbyl magnesium compounds (RMgX; R$_2$Mg) react with polycyclic compounds containing one or more etheno bridges (e.g., bicyclo[2.2.1]hept-2-ene; bicyclo-[2.2.1]hepta-2,5-diene) to produce various novel polycyclic organomagnesium compounds. These in turn can be subjected to various reactions to produce other products.

REFERENCE TO RELATED APPLICATION

This application is a continuation-in-part of my prior copending application Ser. No. 888,071, filed Dec. 24, 1969 now abandoned.

This invention relates to the preparation and reactions of organomagnesium compounds. More particularly, it relates to the formation of novel organomagnesium compounds via intermolecular addition between certain polycyclic compounds and organomagnesium reactants and to new and useful reactions and products based on the use of these novel organomagnesium compounds.

BACKGROUND

In U.S. 3,161,689 Cooper and Finkbeiner disclose that olefins of the formula R—CH=CH$_2$ react with an alkyl Grignard reagent of the formula R'MgX in the presence of titanium or zirconium catalysts such as TiCl$_4$. Where the concentration of titanium or zirconium catalyst is low, the reaction predominately goes in the direction of producing a new Grignard reagent derived from the olefin displacing the R' group of the alkyl Grignard reagent. On the other hand, where the titanium or zirconium catalyst is in a higher concentration range, there is increased tendency toward the formation of addition products of the formula R'RCH—CH$_2$MgX. Also see Cooper and Finkbeiner, J. Org. Chem. 27, 1493 (1962); Finkbeiner and Cooper, J. Org. Chem. 27, 3395 (1962); Finkbeiner and Cooper, Am. Chem. Soc., Div. Petrol. Chem., Preprints 8 (2), B71–B78 (1963).

Tarrant and Heyes, J. Org. Chem. 30, 1485 (1965) describe the reaction of polyfluoro olefins with allylic Grignard reagents. In general, good yields of allylfluoroethylenes are achieved. The authors suggest a reaction mechanism involving addition between the allylic Grignard reagent and the polyfluoro olefin followed by elimination of magnesium dihalide. This reaction was successfully applied to such olefins as tetrafluoroethylene, chlorotrifluoroethylene, bromotrifluoroethylene, unsym-dichlorodifluoroethylene and hexafluoropropene. No reaction occurred between allylmagnesium bromide and trifluoroethylene.

Eisch and Husk, J. Am. Chem. Soc., 87, 4194 (1965), report that on treating allyldiphenylcarbinol in diethyl ether with two equivalents of allylmagnesium bromide (25° C. for 36 hours) an addition reaction occurred. Hydrolysis yielded the corresponding 5-hexenyl carbinol.

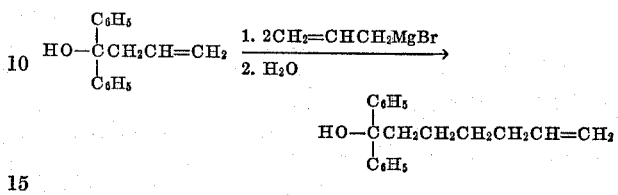

The authors indicated that further research would probe the generality of this reaction by the use of other unsaturated carbinols and amines.

The addition of various fulvenes to certain Grignard reagents has been described [Fuson and Porter, J. Am. Chem. Soc., 70, 895 (1948); Fuson, DeWald and Gaertner, J. Org. Chem., 16, 21 (1951); Fuson and Mumford, J. Org. Chem., 17, 255 (1952)]. The mechanism suggested for these reactions involves participation of the conjugated exocyclic structure of the fulvenes.

Ziegler, Koster and Grimme indicate in U.S. 3,217,020 that ethylene reacts with magnesium alkyls to produce predominately polyethylene, there being no formation of longer chain magnesium alkyls through addition of the ethylene.

DESCRIPTION OF THE INVENTION

This invention involves the discovery that hydrocarbyl magnesium compounds react with a variety of polycyclic compounds containing one or more etheno bridges to produce higher molecular weight organomagnesium compounds. In particular, intermolecular addition occurs between these reactants.

One embodiment of the invention is a process which comprises reacting a hydrocarbyl magnesium halide with a polycyclic compound having at least one etheno bridge traversing the bridgehead carbon atoms of an internally strained polycyclic molecule coreactive with the magnesium compound so that intermolecular addition occurs between said compounds.

The intermolecular addition reactions of this invention result in the formation of different types of end products, the course taken by the reaction being governed by the type of organomagnesium reactant and polycyclic reactant utilized. Thus, this invention provides several classes of new compounds and several new reactions. This is illustrated by the exemplary reactions and products of this invention presented below. For convenience, bicyclo[2.2.1] hepta-2,5-diene and bicyclo[2.2.1]hept-2-ene are utilized in these exemplifications as representative polycyclic reactants, and Grignard reagents are shown as the organomagnesium reactants. The invention is not limited to their use, however.

(a) Reaction of hydrocarbyl magnesium compounds (other than 2-alkenyl magnesium compounds) with polycyclic compounds containing two etheno bridges in the molecule to form a substituted nortricyclic organomagnesium compound:

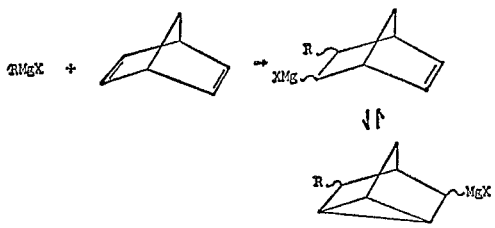

[R=alkyl, cycloalkyl, aryl, aralkyl, alkenyl (except 2-alkenyl), cycloalkenyl, etc.; X=Cl, Br, I].

(b) Reaction of 2-alkenyl magnesium compounds with polycyclic compounds containing two etheno bridges in the molecule (1:1 addition) to form a tricyclo substituted methyl magnesium compound:

[R is defined above].

c. Reaction of 2-alkenyl magnesium compound with polycyclic compounds containing two etheno bridges in the molecule (2:1 addition) to form a tricyclo substituted methylmagnesium compound in which the ring structure is directly bonded to a second magnesium atom:

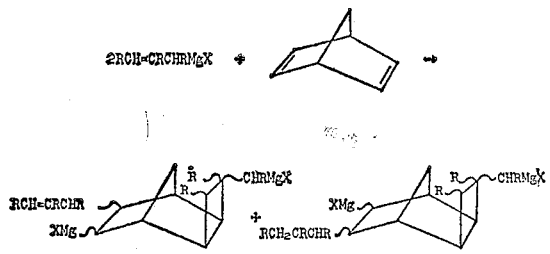

[R is defined above].

d. Reaction of 2-alkenyl manesium compounds with polycyclic compounds containing one etheno bridge in the molecule to form an alkenyl substituted polycyclic organomagnesium compound:

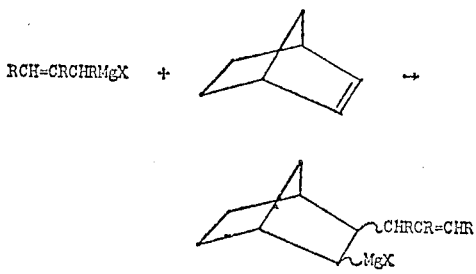

[R is defined above].

It will be seen that reactions (a) through (d) above all involve intermolecular addition between the reactants. Further, in the case of reaction (a) an intramolecular rearrangement occurs subsequent to the intermolecular addition whereas in reactions (b) and (c) intermolecular addition is accompanied by the creation of a substituted fused cyclobutane ring. In this connection, the products of reactions (b) and (c) are depicted in the exo form although it is to be understood that the products may exist in either the exo or endo form or may comprise a mixture of both forms.

In another embodiment this invention furnishes new organomagnesium halides. These are exemplified by the following:

1. A nortricyclene characterized by having a hydrocarbyl substituent in the 3 position and by having the 5 position substituted by a —MgX group where X is Cl, Br, or I;
2. A tricyclo[4.2.1.0$^{2,5}$]non-7-ene characterized by having in the 3 position a carbon-bonded substituent of the formula —CH$_2$MgX where X is Cl, Br, or I;
3. A tricyclo[4.2.1.0$^{2,5}$]nonane characterized by having in the 3 position a carbon-bonded substituent of the formula —CH$_2$MgX where X is Cl, Br, or I and by having the 7 or 8 position substituted by a —MgX group where X is Cl, Br, or I, the other said position being substituted by a 2-alkenyl group;
4. A 3-(2-alkenyl)bicyclo[2.2.1]heptane characterized by having the 2 position substituted by a —MgX group where X is Cl, Br or I; and
5. A tricyclo[5.2.1.0$^{2,6}$]dec-3-ene characterized by having the 8 or 9 position substituted by a —MgX group where X is Cl, Br, or I, the other said position being substituted by a 2-alkenyl group.

The preferred 2-alkenyl substitutent in the compounds of groups 3, 4, and 5 above is the allyl group.

Various polycyclic compounds may be used in practicing the process of this invention. As indicated by the above exemplary reactions, the polycyclic reactant contains at least one etheno bridge in a polycyclic molecule which may be considered as having an internal strain. Thus, the polycyclic reactant includes such compounds as bicyclo[2.1.0]pent-2-ene;
bicyclo[3.2.0]hept-6-ene;
bicyclo[2.2.1]hept-2-ene (2-norbornene);
1,3,3-trimethylbicyclo[2.2.1]hept-5-ene;
1,7,7-trimethylbicyclo[2.2.1]hept-2-ene (bornylene);
2,2,5-trimethylbicyclo[2.2.1]hept-5-ene;
7,7-dimethylbicyclo[2.2.1]hept-2-ene (apobornylene);
3,3-dimethylbicyclo[2.2.1]hept-5-ene (camphenylene);
2,3-dimethylbicyclo[2.2.1]hept-2-ene (santene);
bicyclo[2.2.2]oct-2-ene;
bicyclo[3.2.2.]non-6-ene;
2-methylbicyclo[2.2.2]oct-5-ene;
6-methylbicyclo[3.2.2]non-6-ene;
bicyclo[8.2.2]tetradec-11-ene;
tricyclo[3.2.2.0$^{2,4}$]non-6-ene;
3,3-dimethyl-2-methylenebicyclo[2.2.1]hept-5-ene (isocamphodiene);
5-ethylidenebicyclo[2.2.1]hept-2-ene;
cyclopentadiene dimer;
methylcyclopentadiene dimer;
butylcyclopentadiene dimer;
phenylcyclopentadiene dimer;
bicyclo[2.2.1]hepta-2,5-diene (norbornadiene);
7-methylbicyclo[2.2.1]hepta-2,5-diene;
1-methylbicyclo[2.2.1]hepta-2,5-diene;
7,7-dimethylbicyclo[2.2.1]hepta-2,5-diene;
1,7,7-trimethylbicyclo[2.2.1]hepta-2,5-diene;
1,4-diethylbicyclo[2.1.1]hepta-2,5-diene;
bicyclo[2.2.2]octa-2,5,7-triene;
tricyclopentadiene;

and the like. Thus, among the categories of reactants of this type which are coreactive with the organomagnesium reactant are the polycyclic hydrocarbons containing at least one etheno bridge. These may be represented by the formulas:

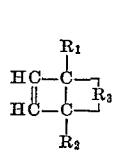 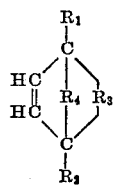

wherein, in the simplest cases, $R_1$ and $R_2$ are independently, hydrogen or lower alkyl groups; $R_3$ is a divalent cyclic or acyclic hydrocarbon radical (i.e., a hydrocarbylene group) which may contain from 1 to about 18 carbon atoms and which normally, but not necessarily, is from 1 to 3 carbon atoms in length; and $R_4$ is an alkylene or alkenylene group which may contain from 1 to about 18 carbon atoms and which normally is from 1 to 3 carbon atoms in length. Of these, the compounds containing an $R_4$ bridge one carbon atom in length (i.e., methylene, monoalkyl substituted methylene and dialkyl substituted methylene) are preferred because of their high reactivity, ready availability and relatively low cost. These preferred reactants may be represented by the formula:

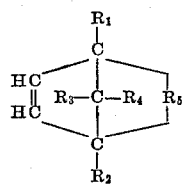

wherein each of $R_3$, $R_2$, $R_3$, and $R_4$ is, individually, hydrogen or an alkyl group and $R_5$ is a divalent hydrocarbon radical from 1 to 3 carbon atoms in length and containing from 1 to about 10 carbon atoms.

The most preferred polycyclic reactants for use in this invention are bicyclo[2.2.1]hepta-2,5-diene; bicyclo[2.2.1]hepta-2,5-dienes substituted with one or more lower alkyl groups or lower alkenyl groups or both; bicyclo[2.2.1]hept-2-ene; bicyclo[2.2.1]hept-2-enes substituted with one or more lower alkyl groups or lower alkenyl groups or both, cyclopentadiene dimer; and cyclopentadiene dimers substituted with one or more lower alkyl groups or lower alkenyl groups or both.

The organomagnesium reactants employed in accordance with this invention may be either Grignard reagents or diorganomagnesium compounds. Thus this reactant has the formula RMgR′ where R is a hydrocarbyl group such as alkyl, cycloalkyl, aryl, aralkyl, alkenyl, cycloalkenyl, and the like and R′ is either R or halogen. Mixtures of the Grignard reagent and its corresponding diorganomagnesium compound may also be employed. Indeed some investigators have suggested that a Grignard reagent involves an equilibrium between the organomagnesium halide and a mixture of the magnesium dihalide and diorganomagnesium. As between these two general classes of compounds the use of the Grignard reagents is preferred. For one thing they are generally easier to prepare than the corresponding diorganomagnesium compounds. Furthermore, by converting the initial Grignard reagent to the final Grignard reagent via the addition reaction of this invention one possesses a material susceptible to a wide variety of uses.

Considering the nature of the hydrocarbon group(s) present in the organomagnesium reactant, the 2-alkenyl compounds have been found particularly reactive and, as indicated by reactions (b) through (d) above, a variety of addition products can be achieved from their use. Although somewhat less reactive than the 2-alkenyl compounds, the remaining hydrocarbyl magnesium compounds lead to the formation of still another class of very interesting and novel addition products [note reaction (a) above]. The reactivities within a given class of organomagnesium reactants will often vary. For example, primary alkyl Grignard reagents will be found more reactive in the process than the corresponding secondary alkyl Grignard reagents, presumably because of steric factors. The use of tertiary alkyl Grignard reagents is not recommended as they react very slowly, if at all. The suitability of any given hydrocarbyl magnesium compound for use in the process of this invention can be readily ascertained by means of a simple trial experiment.

Illustrative organomagnesium reactants are:

2-alkenyl compounds: allylmagnesium chloride, allylmagnesium bromide, allylmagnesium iodide, bis-allylmagnesium, methallyl magnesium chloride, methallyl magnesium bromide, methallyl magnesium iodine, bis-methallyl magnesium, 2-butenyl magnesium chloride, 2-butenyl magnesium bromide, 2-butenyl magnesium iodide, bis-(2-butenyl)magnesium, 2-pentenyl magnesium chloride, 2-hexenyl magnesium bromide, 4-methyl-2-pentenyl magnesium bromide, cinnamyl magnesium bromide, and the like.

Other hydrocarbyl compounds: methylmagnesium bromide, ethylmagnesium chloride, propylmagnesium bromide, isopropylmagnesium bromide, diisopropyl magnesium, butylmagnesium chloride, 2-octylmagnesium iodide, 5-decyl magnesium bromide, cyclohexylmagnesium bromide, methylcyclohexyl magnesium chloride, bis-cyclohexyl magnesium, phenylmagnesium chloride, tolylmagnesium bromide, mesityl magnesium iodide, bis-cumenyl magnesium, benzylmagnesium chloride, 2-phenethyl magnesium bromide, p-methylbenzyl magnesium iodide, vinylmagnesium chloride, vinyl-magnesium bromide, propenylmagnesium bromide, cyclohexenyl magnesium bromide, and the like.

The most preferred 2-alkenyl magnesium compounds are allylmagnesium chloride and allylmagnesium bromide. The most preferred of the other hydrocarbyl magnesium compounds are the straight chain primary alkyl magnesium chlorides and bromides, especially where the alkyl groups contain up to about 12 carbon atoms.

As a general rule the Grignard reagents will be subjected to the addition reactions of this invention in a reaction medium composed predominantly of an ether although, if desired, it is feasible to perform the reactions in a hydrocarbon medium. Thus, use may be made of such ethers as dimethyl ether, diethyl ether, dibutyl ether, tetrahydrofuran, 2-methyl-tetrahydrofuran, 2,5-dimethyl-tetrahydrofuran, 1,4-dioxane, the dimethyl ether of ethylene glycol, the dibutyl ether of ethylene glycol, the dimethyl ether of diethylene glycol, the diethyl ether of diethylene glycol, the dibutyl ether of diethylene glycol, and the like. Pyridine, dimethyl sulfoxide, dimethyl formamide, hexamethyl phosphoramide, or other strong Lewis base complexing solvents may also be suitable. Ordinarily the use of diethyl ether and dibutyl ether is preferred.

If desired, the ether reaction media may be further diluted with innocuous solvents such as aliphatic, cycloaliphatic or aromatic hydrocarbons or the like.

The dihydrocarbyl magnesium reactants are usually produced and used in a reaction medium composed predominately of a suitable paraffinic, cycloparaffinic or aromatic hydrocarbon (e.g., decane, dodecane, xylene, mesitylene and the like), although the use of an ether having a basicity of less than diethyl ether (e.g., diisopropyl ether, anisole, phenetole, diphenyl ether, phenyl isopropyl ether and the like) is feasible.

Reaction temperatures between about 50 and about 200° C. will usually suffice, temperatures falling in the range of about 100 to about 175° C. being preferred. Depending upon the reactants, solvent and temperature used, the pressure may range from atmospheric pressure up to about 100 atmospheres or more. The usual precautions for Grignard reactions should be observed—e.g., the system should be kept essentially anhydrous and exposure to the atmosphere should be kept at a minimum.

This invention will become still further apparent from a consideration of the following illustrative examples.

EXAMPLE I

Reaction between ethylmagnesium bromide and bicyclo [2.2.1]hepta-2,5-diene followed by hydrolysis A diethyl ether solution of ethylmagnesium bromide (50 ml.; 52 mmoles) was placed in a 75-milliliter bomb. Then 5.05 ml. (50 mmoles) of bicyclo[2.2.1]hepta-2,5-diene (i.e., bicycloheptadiene or norbornadiene) was added. The bomb was sealed and heated for three hours at 125–140° C. A portion of the reaction mixture was hydrolyzed and analyzed by mass spectrography. The hydrolyzed product was shown to have a molecular weight of 122 which corresponds to $C_9H_{14}$. The hydrolysis product of molecular weight 122 was 3-ethylnortricyclene, the nortricyclic structure being of known stability [Roberts, Trumble Jr., Bennett and Armstrong, J. Am. Chem. Soc. 72, 3116 (1950); Cowan and Krieghoff, J. Org. Chem. 32, 2639 (1967)].

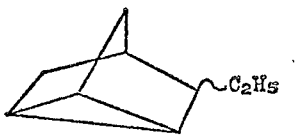

It was produced in an over-all yield of about 20 percent.

EXAMPLE II

Reaction between ethylmagnesium bromide and bicyclo-[2.2.1]hepta-2,5-diene followed by hydrolysis A diethyl ether solution of ethylmagnesium bromide (50 ml.; 78 mmoles) was placed in a 75-milliliter bomb. Then 7.7 ml. (75 mmoles) of bicyclo[2.2.1]hepta-2,5-diene was added. The bomb was sealed and heated for forty hours at 140° C. The product was hydrolyzed slowly over a period of one and one-half hours with water in refluxing diethyl ether at 35° C. Hydrolysis was completed by adding excess aqueous ammonium chloride solution to dissolve the magnesium salts. The ether solution was washed with water and dried over magnesium sulfate. The ether was then removed at atmospheric pressure by heating in an oil bath at 50° C. The product was then vacuum distilled and the fraction boiling at 96° C. at 146–150 mm. Hg was isolated (2.23 grams). Analysis of this fraction by NMR, vpc and mass spectrography established that the compound was 3-ethylnortricyclene having a purity of 94 percent. It was recovered in a yield of 24 percent.

EXAMPLE III

Reaction between ethylmagnesium bromide and bicyclo [2.2.1]hepta-2,5-diene followed by oxidation and hydrolysis A diethyl ether solution of ethylmagnesium bromide (50 ml.; 78 mmoles) was placed in a 75-milliliter bomb and 7.7 ml. (75 mmoles) of bicyclo[2.2.1]hepta-2,5-diene was added. The sealed bomb was heated for 16 hours at 140° C. The reaction product was then oxidized by bubbling an excess of pure oxygen through the solution while maintaining the temperature at 0° C. by means of an ice bath. Thereupon the product was hydrolyzed with an aqueous ammonium chloride solution, diluted with diethyl ether, and the ether layer was washed with water and dried over magnesium sulfate. The ether solvent was stripped off by heating the solution at 50° C. at atmospheric pressure. Vacuum distillation of the residual material yielded 2.2 grams of close-boiling fraction, the major portion of which boiled at 96° C. at 11 mm. Hg. Analysis of the product by means of vpc, infrared, and NMR showed it to consist of a mixture of three $C_9$ alcohols in the proportions of 66 percent, 18 percent, and 15 percent; and that the mixture was composed of 5-ethylbicyclo-[2.2.1]hept-2-en-6-ol and 3-ethylnortricyclen-5-ol as exo and endo isomers. These $C_9$ alcohols were produced in an isolated yield of 21 percent. Consequently in this reaction the organomagnesium product was an equilibrium mixture of 3-ethylnortricyclen-5-yl magnesium bromide:

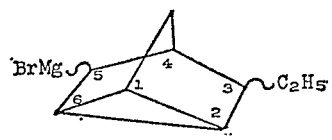

and 5-ethylbicyclo[2.2.1]hept-2-en-6-yl magnesium bromide:

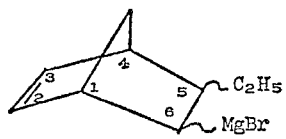

EXAMPLE IV

Reaction between isopropylmagnesium bromide and bicyclo[2.2.1]hepta-2,5-diene followed by hydrolysis A mixture of isopropylmagnesium bromide in diethyl ether (50 ml.; 50 mmoles) and bicyclo[2.2.1]hepta-2,5-diene (5 ml.; 50 mmoles) was heated in a sealed bomb for two hours at 165° C. Hydrolysis of the reaction product with water at about room temperature gave a 27 percent yield of 3-isopropylnortricyclene having a molecular weight of 136.

EXAMPLE V

1:1 reaction between allylmagnesium bromide and bicyclo-[2.2.1]hepta-2,5-diene followed by hydrolysis A 75-milliliter bomb was charged with a diethyl ether solution of allylmagnesium bromide (50 ml.; 46 mmoles) and 4.1 grams (4.5 ml.; 45 mmoles) of freshly distilled bicyclo[2.2.1]hepta - 2,5 - diene. The sealed bomb was heated in an oil bath at 130–150° C. for 3 hours, the contents of the bomb being agitated several times during this period. The reaction mixture was treated with an aqueous solution of ammonium chloride and then the diethyl ether solution was washed with water and dried over anhydrous magnesium sulfate. After stripping off the ether solvent the product was vacuum distilled (46 mm. Hg; pot temperature: 114–117° C.; overhead temperature: 81–82° C.) and in this distillation 3.4 grams of distillate were recovered. Analysis of the product by NMR (2 olefinic protons; 12 aliphatic protons) and mass spectrography (molecular weight: 134) indicated the product to be 3-methyltricyclo-[4.2.1.0$^{2,5}$]non-7-ene:

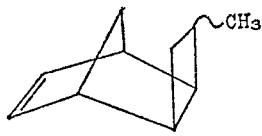

It was produced in a yield of at least 55 percent.

Accordingly, the organomagnesium product of this reaction was tricyclo[4.2.1.0$^{2,5}$]non-7-en-3-yl-methylmagnesium bromide:

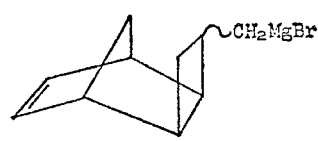

Further verification of the above structures was provided by subjecting the hydrolysis product ($C_{10}H_{14}$) to reduction in order to ascertain chemically whether it contained a cyclopropyl group or an olefinic double bond. In particular, 0.2 gram of a 5 percent platinum/asbestos hydrogenation catalyst was placed in 4 ml. of ethyl acetate. Then one ml. of the hydrolysis product ($C_{10}H_{14}$) was added and the mixture treated with hydrogen at atmospheric pressure for about 16 hours at room temperature. By means of vpc and mass spectrographic analyses it was established that reduction had occurred and that the hydrocarbon of molecular weight 134 had been converted during the reduction into a new product of molecular weight 136. Analysis by NMR of the reduction product confirmed the disappearance of the olefinic linkage and gave no evidence of cyclopropane protons. It was concluded therefore that the reduction product was 3-methyltricyclo[4.2.1.0$^{2,5}$]nonane:

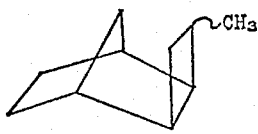

EXAMPLE VI

1:1 reaction between allylmagnesium bromide and bicyclo[2.2.1]hepta - 2,5 - diene followed by oxidation and hydrolysis Allylmagnesium bromide (50 mmoles) and bicyclo[2.2.1]hepta-2,5-diene (50 mmoles) were reacted in diethyl ether in a sealed bomb by heating for 2.25 hours at 125° C. and one hour at 140° C. The reaction product was then oxidized at 0° C. by passing gaseous oxygen through the product for about 30 minutes. The resultant product was then hydrolyzed with water followed by aqueous ammonium chloride solution and then water. After drying the product over anhydrous magnesium sulfate, the diethyl ether solvent was removed using a steam bath. The product was vacuum distilled and the fraction boiling at 95–101° C. at 2.5–3 mm. Hg was collected. This product, tricyclo[4.2.1.0$^{2,5}$]non-7-en-3-yl-methanol, was isolated in a 70 percent yield and its structure was supported by the results of nuclear magnetic resonance studies. It may be depicted as follows:

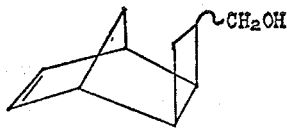

EXAMPLE VII

1:1 reaction between allylmagnesium bromide and bicyclo[2.2.1]hepta-2,5-diene followed by oxidation and hydrolysis The procedure of Example VI was repeated on a larger scale by reacting 195 mmoles of allylmagnesium bromide in diethyl ether with 218 mmoles of bicyclo[2.2.1]hepta-2,5-diene at 125° C. for 3 hours. After the oxidation and hydrolysis, distillation gave tricyclo[4.2.1.0$^{2,5}$]non-7-en-3-yl-methanol (B.P. 97–99° C. at 1 mm. Hg) in 73 percent yield based on the allylmagnesium bromide.

EXAMPLE VIII

1:1 reaction between allylmagnesium bromide and bicyclo[2.2.1]hepta-2,5-diene followed by oxidation hydrolysis and esterification A still larger quantity of tricyclo[4.2.1.0$^{2.5}$]non-7-ene-3-yl-methanol (i.e., 3-methyloltricyclo[4.2.1.0$^{2.5}$]non-7-ene) was prepared by oxidizing and hydrolyzing the product obtained by reaction of 260 mmoles of allylmagnesium bromide in diethyl ether with 304 mmoles of bicyclo[2.2.1]hepta-2,5-diene in a 300-milliliter bomb for 3 hours at 122° C. with occasional shaking. The hydrolysis was effected using dilute aqueous HCl followed by treatment with water, dilute aqueous sodium bicarbonate solution and then water. After drying the product, distillation gave the substituted methanol in 81 percent yield based on the allyl Grignard reagent employed. A portion of this product was converted to the acetate ester by treating it with a mixture of acetic anhydride, perchloric acid and ethyl acetate. This esterification yielded tricyclo[4.2.1.0$^{2,5}$]non-7-en-3-yl-methyl acetate. Analysis by vpc showed that this ester was composed of two major stereo-isomers in a ratio of approximately 5:1. Collectively the ester product can be represented by the formula:

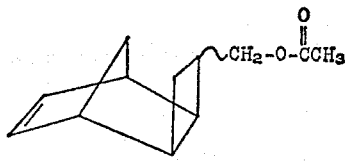

EXAMPLE IX

1:1 reaction between allylmagnesium bromide and bicyclo[2.2.1]hepta-2,5-diene followed by carbonation and hydrolysis Tricyclo[4.2.1.0$^{2.5}$]non-7-en-3-yl-methylmagnesium bromide was produced by reaction in diethyl ether between allylmagnesium bromide (130 moles) and bicyclo[2.2.1]hepta-2,5-diene (152 mmoles) at 125–130° C. for 3 hours. The product was then carbonated by pouring it over a slurry of solid carbon dioxide in diethyl ether at −78° C. Then the product was hydrolyzed using dilute aqueous ammonium chloride followed by water washing. After drying, the solvent was removed from the product by vacuum distillation. The product which remained was then distilled using a semi-micro distillation column and yielded a product fraction boiling at 129.5–130° C. at 1.3 mm. Hg. Analyses by NMR and infrared showed the product was an olefinic acid and therefore the product was tricyclo[4.2.1.0$^{2,5}$]non-7-en-3-yl-acetic acid:

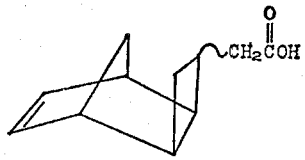

It was recovered in a yield of 58 percent.

EXAMPLE X

2:1 reaction between allylmagnesium bromide and bicyclo[2.2.1]hepta-2,5-diene followed by hydrolysis A mixture of $C_{13}$ compounds containing two C-Mg-Br bonds was produced by heating in a small autoclave 20 mmoles of allylmagnesium bromide with 10 mmoles of bicyclo[2.2.1]hepta-2,5-diene at 125° C. for 3 hours in a diethyl ether reaction medium. Hydrolysis of the reaction product liberated a mixture of $C_{13}$ hydrocarbons having four major components, i.e., the product was composed of positional and stereo-isomers. Thus, the reaction may be depicted as follows:

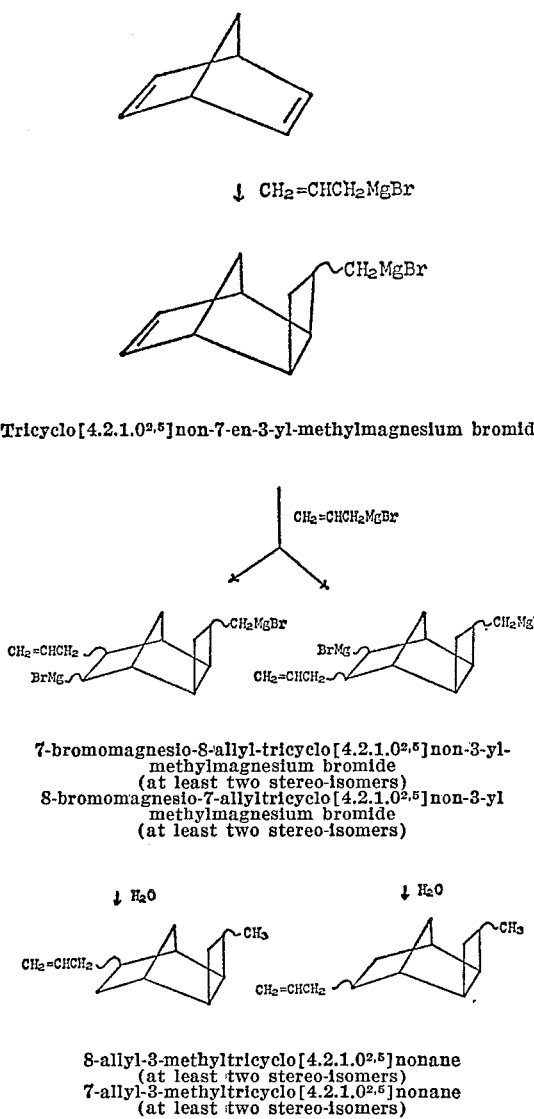

Tricyclo[4.2.1.0²,⁵]non-7-en-3-yl-methylmagnesium bromide 7-bromomagnesio-8-allyl-tricyclo[4.2.1.0²,⁵]non-3-yl-methylmagnesium bromide
(at least two stereo-isomers)
8-bromomagnesio-7-allyltricyclo[4.2.1.0²,⁵]non-3-yl methylmagnesium bromide
(at least two stereo-isomers)

8-allyl-3-methyltricyclo[4.2.1.0²,⁵]nonane
(at least two stereo-isomers)
7-allyl-3-methyltricyclo[4.2.1.0²,⁵]nonane
(at least two stereo-isomers)

EXAMPLE XI

Reaction between allylmagnesium bromide and bicyclo[2.2.1]hept-2-ene followed by hydrolysis or by oxidation and hydrolysis A diethyl ether solution of allylmagnesium bromide (50 ml.; 50 mmoles) and bicyclo[2.2.1]hept-2-ene (4.7 grams; 50 mmoles) were heated in an autoclave at 135° C. for 3 hours. A small sample of the reaction product (1 ml.) was hydrolyzed and the liberated hydrocarbon product subjected to vpc and mass spectrography analyses. It was shown that the hydrocarbon product had a molecular weight of 136 which corresponds to the empirical formula $C_{10}H_{16}$. The remainder of the reaction product was oxidized at 0° C. with oxygen and the resultant product subjected to hydrolysis using dilute aqueous ammonium chloride solution. The ether solution from the hydrolysis was washed with dilute HCl, water, aqueous sodium bicarbonate solution and water, and then dried over magnesium sulfate. The dried product was heated on a steam bath to strip the diethyl ether and the residue was subjected to vacuum distillation which yielded 3.9 grams of a product having a boiling point of 100° C. at 3 mm. Hg. Analysis by NMR and infrared indicated the product to be 3-allyl-bicyclo[2.2.1]heptan-2-ol:

It was recovered in 52 percent yield. When this terminally unsaturated secondary alcohol was passed through a 0.02" x 150' Carbowax 20M capillary column, it was separated into almost equal amounts of the endo and exo stereo-isomers. The Grignard reagent produced in this experiment was 3-allylbicyclo[2.2.1]hept-2-yl-magnesium bromide:

EXAMPLE XII

Reaction between allylmagnesium bromide and bicyclo-[2.2.1]hept-2-ene followed by hydrolysis A 75-milliliter bomb was charged with 50 ml. of allylmagnesium bromide/diethyl ether solution (50 mmoles of the Grignard reagent) and 4.7 grams (50 mmoles) of bicyclo[2.2.1]hept-2-ene. The sealed bomb was heated in an oil bath for 3 hours at 125° C. The reaction product was hydrolyzed, water washed, dried and distilled at reduced pressure. This gave a 52 percent yield of 2-allyl-bicyclo[2.2.1]heptane (i.e., 2-allylnorbornane) which boiled at 84–85° C. at 45 mm. Hg. In U.S. 3,183,220, Dekking reports the boiling point of this compound as 62–63° C. at 13 mm. Hg. Infrared and NMR analyses of the product produced in this run were consistent with its assigned structure.

EXAMPLE XIII

Competitive reaction of bicyclo[2.2.1]hepta-2,5-diene and bicyclo[2.2.1]hept-2-ene with allylmagnesium bromide followed by hydrolysis A 10-milliliter bomb was charged with a diethyl ether solution of allylmagnesium bromide (5 ml.; 5 mmoles), 5 mmoles of bicyclo[2.2.1]hepta-2,5-diene and 5 mmoles of bicyclo[2.2.1]hept-2-ene. The bomb was sealed and heated for 3 hours at 125° C. in an oil bath. The product was hydrolyzed, water washed, and dried, and then subjected to vpc analysis. It was found that the molar ratio between the 3-methyltricyclo[4.2.1.0²,⁵]non-7-ene and the 2-allylbicyclo[2.2.1]heptane was 2.36:1 which indicates that the bicyclo[2.2.1]hepta-2,5-diene was about twice as reactive to the allyl Grignard reagent as was the bicyclo[2.2.1]hept-2-ene.

EXAMPLE XIV

Reaction between allylmagnesium bromide and cyclopentadiene dimer followed by hydrolysis Allylmagnesium bromide (50 mmoles) and cyclopentadiene dimer (50 mmoles) were reacted in ether in a sealed bomb at 125° C. for 3 hours. Hydrolysis of the reaction product liberated two $C_{13}$ hydrocarbons. Thus the reaction proceeded as follows:

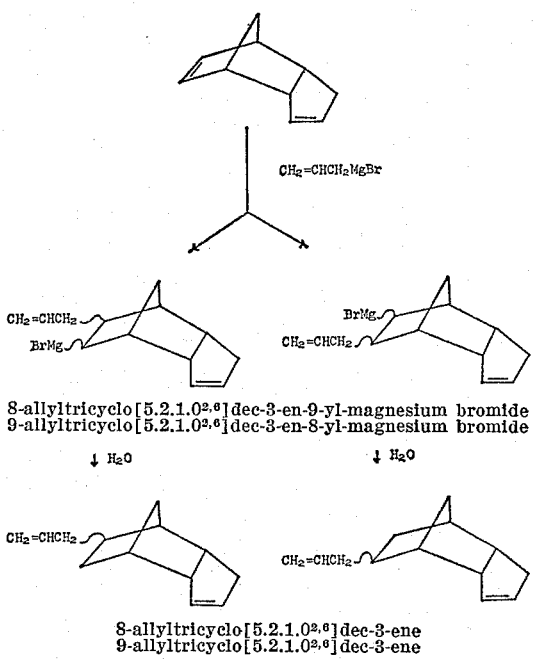

8-allyltricyclo[5.2.1.0$^{2,6}$]dec-3-en-9-yl-magnesium bromide
9-allyltricyclo[5.2.1.0$^{2,6}$]dec-3-en-8-yl-magnesium bromide

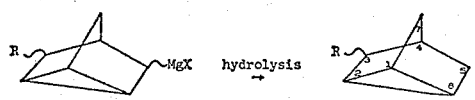

8-allyltricyclo[5.2.1.0$^{2,6}$]dec-3-ene
9-allyltricyclo[5.2.1.0$^{2,6}$]dec-3-ene From the above examples it will be clear that there are various uses to which the organomagnesium products of this invention may be put. Some of these novel uses are considered below.

A. Reactions of nortricyclic magnesium compounds (i) Preparation of tricyclenes having a hydrocarbyl substituent in the 3 position:

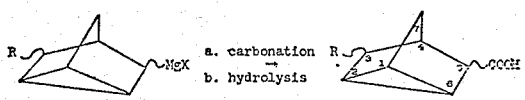

This synthesis is accomplished by hydrolyzing a 3-hydrocarbyl nortricyclic magnesium compound which, in turn, may be prepared in accordance with this invention via reaction (a), supra. To effect this hydrolysis use may be made of water, dilute mineral acids, aqueous bases, aqueous ammonium chloride solutions, or the like. The temperature of the hydrolysis reaction is generally kept in the range of from about 0 to about 35° C.

Examples of compounds which may be produced in this manner include 3-methylnortricyclene; 3-propylnortricyclene; 3-octylnortricyclene; 3-dodecylnortricyclene; 3-vinylnortricyclene; 3-benzylnortricyclene; 3-phenylnortricyclene; 3,7-dimethylnortricyclene; 3-cyclohexyl-1-methyl-nortricyclene; 3-butyl-1,2-dimethylnortricyclene; 3-phenethyl-7,7-dimethylnortricyclene and the like.

(ii) Preparation of tricyclenes having a hydrocarbyl substituent in the 3 position and a carboxyl group in the 5 position:

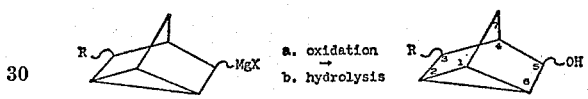

The carbonation step of this synthesis is preferably conducted by effecting contact between a 3-hydrocarbyl nortricyclic magnesium compound and solid carbon dioxide at a suitably low temperature. However, if desired, gaseous carbon dioxide may be utilized in the reaction and in this case the reaction is preferably conducted at mildly elevated temperatures and pressures. The hydrolysis reaction is effected as described under Section A(i) above.

The resultant free acid may in turn be subjected to a variety of reactions. For example, it may be partially reduced to form the corresponding aldehyde or it may be reduced further to produce the corresponding alcohol. If desired, the free acid may be converted into a metallic salt by treatment with an appropriate metallic oxide or hydroxide. Similarly, the free acid may be esterified by interaction with a suitable monohydric or polyhydric alcohol, usually in the presence of a conventional esterification catalyst.

Examples of the compounds which may be produced in this manner are 3-butylnortricyclen-5-yl-carboxylate;
3-hexylnortricylen-5-yl-carboxylate;
3-heptylnortricyclen-5-yl-carboxylate;
3-p-tolylnortricyclen-5-yl-carboxylate;
3-cyclohex-3-enylnortricyclen-5-yl-carboxylate;
3-butyl-1,4-dimethylnortricyclen-5-yl-carboxylate;
1-methyl-3-(4-methylcyclohexyl)nortricyclen-5-yl-carboxylate;

the methyl, butyl, octyl and lauryl esters of each of these acids; the lithium, sodium, potassium, magnesium, calcium, zinc and aluminum salts of each of these acids; and the alcohols and aldehydes from each of these acids.

(iii) Preparation of tricyclenes having a hydrocarbyl substituent in the 3 position and a hydroxyl group in the 5 position:

In conducting this synthesis reaction a 3-hydrocarbyl nortricyclic magnesium compound is treated with oxygen or air under suitable temperature and pressure conditions and the resultant intermediate is then hydrolyzed as described in Section A(i) above. The reaction is preferably conducted at temperatures in the range of about —40 to about 65° C. using pressures ranging from about 100 to about 1000 millimeters of Hg.

The cyclic alcohol in turn may be converted into other useful end products. Thus, for example, the nortricyclic alcohol may be esterified by treatment under esterification conditions with an organic acid or suitable derivative thereof such as an acid anhydride or acid halide. Similarly, treatment of the cyclic alcohol with an active metal such as sodium or potassium leads to the formation of the corresponding alcoholate salt. Reaction of the alcohol or its alkali metal salt with inorganic and organic phosphorus compounds (e.g., $PCl_3$, $POCl_3$, $PSCl_3$, $RPCl_2$, $(RO)_2POCl$ etc.) leads ot the synthesis of a variety of interesting phosphorus esters.

By use of this synthesis reaction it is now possible to prepare such compounds as 3-methylnortricyclen-5-ol;
3-ethylnortricyclen-5-ol;
3-isopropylnortricyclen-5-ol;
3-butyl-7,7-dimethylnortricyclen-5-ol;
3-(4-pentenyl)nortricyclen-5-ol;
1,4-dimethyl-3-octylnortricyclen-5-ol;

the acetyl, hexanoyl and decanoyl esters of each of these alcohols; the sodium and potassium salts of each of these alcohols; and the phosphite, phosphate and thiophosphate esters of each of these alcohols.

B. Reactions of tricyclo substituted methyl-magnesium compounds (i) Preparation of 3-methyltricycloalkenes:

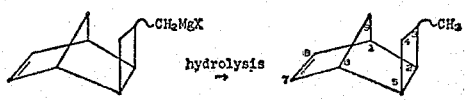

This reaction involves hydrolyzing a tricyclo[4.2.1.0²,⁵]-non-7-en-3-yl-methylmagnesium halide which, in turn, is formed via reaction (b), supra.

The conditions used in this hydrolysis reaction are comparable to those discussed under Section A(i) above.

Typical products which may be produced in this manner include 3,4-dimethyltricyclo[4.2.1.0²,⁵]non-7-ene;
3,3-dimethyltricyclo[4.2.1.0²,⁵]non-7-ene;
3,9,9-trimethyltricyclo[4.2.1.0²,⁵]non-7-ene;
1,3,9,9-tetramethyltricyclo[4.2.1.0²,⁵]non-7-ene;
3-methyl-4-hexyltricyclo[4.2.1.0²,⁵]non-7-ene;

and the like.

(ii) Preparation of 3-carboxymethyltricycloalkenes:

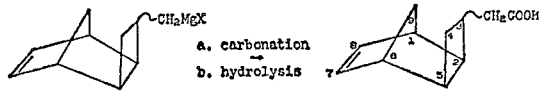

The reaction conditions used in these carbonation and hydrolysis steps are comparable to those described in Section (A(ii) above. The resulting acids may be esterified, reduced, or converted into metallic salts.

Compounds producible in this manner include 3-methyltricyclo[4.2.1.0²,⁵]non-7-en-3-yl-acetic acid;
4-methyltricyclo[4.2.1.0²,⁵]non-7-en-3-yl-acetic acid;
3,4-dimethyltricyclo[4.2.1.0²,⁵]non-7-en-3-yl-acetic acid;
9,9-dimethyltricyclo[4.2.1.0²,⁵]non-7-en-3-yl-acetic acid;
7,8-diethyltricyclo[4.2.1.0²,⁵]non-7-en-3-yl-acetic acid;
7-hexyltricyclo[4.2.1.0²,⁵]non-7-en-3-yl-acetic acid;

the aldehydes corresponding to each of these acids; the methyl, ethyl, butyl and phenethyl esters of each of these acids; and the lithium, sodium, potassium, calcium, barium and magnesium salts of each of these acids.

(iii) Preparation of 3-methyloltricycloalkenes:

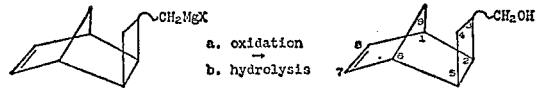

The conditions used in this synthesis reaction are comparable to those described in Section A(iii) above. The alcohols so formed may be esterified or converted into alcoholate salts.

Typical compounds which may be produced by means of this reaction include 3-methyltricyclo[4.2.1.0²,⁵]non-7-en-3-yl-methanol;
4-methyltricyclo[4.2.1.0²,⁵]non-7-en-3yl-methanol;
4-ethyltricyclo[4.2.1.0²,⁵]non-7-en-3-yl-methanol;
7-pentyltricyclo[4.2.1.0²,⁵]non-7-en-3-yl-methanol;
9,9-dimethyltricyclo[4.2.1.0²,⁵]non-7-en-3-yl-methanol;
3,7-dimethyltricyclo[4.2.1.0²,⁵]non-7-en-3-yl-methanol;

the acetyl, propionyl and heptanoyl esters of each of these alcohols; the phosphite, phosphate and thiophosphate esters of each of these alcohols; and the lithium, sodium and potassium salts of each of these alcohols.

C. Reactions of tricyclo substituted methylmagnesium compounds in which the Ring structure is directly bonded to a second magnesium atom (i) Preparation of 3-methyltricycloalkanes substituted in the ring by a 2-alkenyl group:

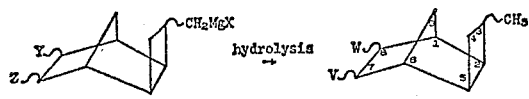

(Y or Z is 2-alkenyl, the other is MgX; W or V is 2-alkenyl, the other is H.)

In this synthesis the tricyclo di-Grignard reagent carrying a 2-alkenyl group on the ring is subjected to hydrolysis utilizing the conditions given in Section A(i) above. These di-Grignard reagents, in turn, are prepared according to this invention via reaction (c), supra.

Some of the compounds which may be prepared by means of this reaction are 7-methallyl-3-methyltricyclo[4.2.1.0²,⁵]nonane;
8-methallyl-3-methyltricyclo[4.2.1.0²,⁵]nonane;
7-crotonyl-3-methyltricyclo[4.2.1.0²,⁵]nonane;
8-crotonyl-3-methyltricyclo[4.2.1.0.²,⁵]nonane;
7-pent-2-enyl-3-methyltricyclo[4.2.1.0²,⁵]nonane;
8-pent-2-enyl-3-methyltricyclo[4.2.1.0²,⁵]nonane;
7-allyl-3,9,9-trimethyltricyclo[4.2.1.0²,⁵]nonane;
8-allyl-3,9,9-trimethyltricyclo[4.2.1.0²,⁵]nonane;

and the like.

(ii) Preparation of 3-carboxymethyltricycloalkanes substituted in the ring by a 2-alkenyl group and a carboxyl group:

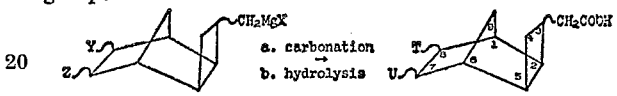

(Y or Z is 2-alkenyl, the other is MgX; T or U is 2-alkenyl, the other is COOH)

In conducting this reaction the conditions described in Section A(ii) above are employed.

The resultant polycyclic dibasic acid may, in turn, be subjected to various reactions such as partial reduction to an aldehyde or complete reduction to a diol. Similarly the compound may be esterified or it may be converted into metallic salts.

Typical compounds which may be synthesized in this manner include 7-allyl-8-carboxytricyclo[4.2.1.0²,⁵]non-3-yl-acetic acid;
8-allyl-7-carboxytricyclo[4.2.1.0²,⁵]non-3-yl-acetic acid;
7-pent-2-enyl-8-carboxy-4-ethyltricyclo[4.2.1.0²,⁵]non-3-yl-acetic acid;
8-pent-2-enyl-7-carboxy-4-ethyltricyclo[4.2.1.0²,⁵]non-3-yl-acetic acid;
7-allyl-8-carboxy-9,9-dimethyltricyclo[4.2.1.0²,⁵]non-3-yl-acetic acid;
8-allyl-7-carboxy-9,9-dimethyltricyclo[4.2.1.0²,⁵]non-3-yl-acetic acid;
7-crotonyl-8-carboxy-4-methyltricyclo[4.2.1.0²,⁵]non-3-yl-acetic acid;
8-crotonyl-7-carboxy-4-methyltricyclo[4.2.1.0²,⁵]non-3-yl-acetic acid;

the ethyl, butyl, heptyl and dodecyl esters and half esters of each of these acids; the lithium, sodium, potassium, magnesium, and aluminum salts of each of these acids, the aldehydes and the diols derived by reducing each of these acids; and the like.

(iii) Preparation of 3-methyloltricycloalkanes substituted in the ring by a 2-alkenyl group and a hydroxy group:

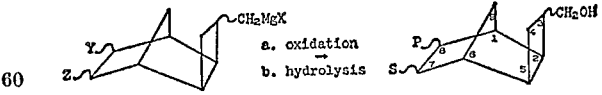

(Y or Z is 2-alkenyl, the other is MgX; P or S is 2-alkenyl, the other is OH).

The oxidation and hydrolysis conditions used in this synthesis procedure are as described in Section A(iii) above. The tricyclic diol thus produced may be converted into other compounds. For example, the diols may be esterified or converted into alcoholate salts.

Utilization of these synthesis procedures enables the preparation of such compounds as 7-allyl-8-hydroxy-tricyclo[4.2.1.0²,⁵]non-3-yl-methanol;
8-allyl-7-hydroxy-tricyclo[4.2.1.0²,⁵]non-3-yl-methanol;
7-allyl-8-hydroxy-9,9-dimethyltricyclo[4.2.1.0²,⁵]non-3-yl-methanol;

8-allyl-7-hydroxy-9,9-dimethyltricyclo[4.2.1.0$^{2,5}$]non-3-yl-methanol;
7-crotonyl-8-hydroxy-4-methyltricyclo[4.2.1.0$^{2,5}$]non-3-yl methanol;
8-crotonyl-7-hydroxy-4-methyltricyclo[4.2.1.0$^{2,5}$] non-3-yl-methanol;

the propionyl, heptanoyl and benzoyl esters of each of these diols; the sodium and potassium salts of each of these diols; and the dialkyl and diaryl phosphite, phosphate and thiophosphate esters of each of these diols.

D. Reactions of alkenyl polycyclic organomagnesium compounds (i) Preparation of 2-alkenyl polycycloalkanes:

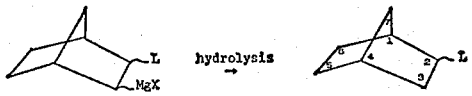

L is 2-alkenyl.)

In effecting this hydrolysis reaction use should be made of the conditions described in Section A(i) above. The organomagnesium reactant utilized in this reaction is made in accordance with this invention via reaction (d), supra.

Illlustrative compounds which may be produced in this manner include 2-methallylbicyclo[2.2.1]heptane; 2-crotonyl-bicyclo[2.2.1]heptane; 2-pent-2-enyl-bicyclo[2.2.1]heptane; 2-allyl-1-methylbicyclo[2.2.1]heptane; 2-allyl-7,7-dimethyl-bicyclo[2.2.1]heptane; and the like.

(ii) Preparation of 2-alkenyl polycycloalkane carboxylates:

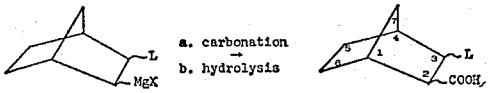

(L is 2-alkenyl.)

The conditions described in Section A(ii) above are utilized for this reaction.

The resultant acid may be converted into other useful derivatives such as esters, aldehydes, alcohols, metallic salts, and the like.

Some of the compounds which may be prepared in this manner include 3-allylbicyclo[2.2.1]heptane-2-carboxylic acid;
3-allyl-7,7-dimethylbicyclo[2.2.1]heptane-2-carboxylic acid;
3-crotonylbicyclo[2.2.1]heptane-2-carboxylic acid;
3-pent-2-enylbicyclo[2.2.1]heptane-2-carboxylic acid;
8-allyltricyclo[5.2.1.0$^{2,6}$]dec-3-ene-9-carboxylic acid;
9-allyltricyclo[5.2.1.0$^{2,6}$]dec-3-ene-8-carboxylic acid;
8-allyl-4,5,10,10-tetramethyltricyclo[5.2.1.0$^{2,6}$]dec-3-ene-9-carboxylic acid;
9-allyl-4,5,10,10-tetramethyltricyclo[5.2.1.0$^{2,6}$]dec-3-ene-8-carboxylic acid;

the methyl, ethyl, butyl and octyl esters of each of these acids; the lithium, sodium, potassium, calcium, magnesium and zinc salts of each of these acids; and the aldehydes and alcohols obtained by reducing each of these acids.

(iii) Preparation of 2-alkenyl polycycloalkanols:

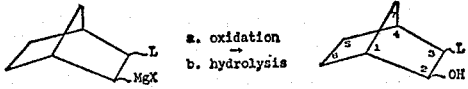

(L is 2-alkenyl.)

For the conditions used in this reaction, see Section A(iii) above.

The alcohols produced in this reaction sequence may be converted into other useful products, e.g., by esterification, etc.

Some of the compounds which may be produced by means of this reaction are 3-allylbicyclo[2.2.1]heptan-2-ol;
3-methallylbicyclo[2.2.1]heptan-2-ol;
3-crotonylbicyclo[2.2.1]heptan-2-ol;
3-allyl-7,7-dimethylbicyclo[2.2.1]heptan-2-ol;
3-allyl-1-methylbicyclo[2.2.1]heptan-2-ol;
3-allyl-4-methylbicyclo[2.2.1]heptan-2-ol;
8-allyltricyclo[5.2.1.0$^{2,6}$]dec-2-en-9-ol;
9-allyltricyclo[5.2.1.0$^{2,6}$]dec-3-en-8-ol;
8-allyl-4,5,10,10-tetramethyltricyclo[5.2.1.0$^{2,6}$]dec-3-en-9-ol;
9-allyl-4,5,10 10-tetramethyltricyclo[5.2.1.0$^{2,6}$]dec-3-en-8-ol;

the acetyl, neohexanoyl and octanoyl esters of each of these alcohols; the phosphite, phosphate, and thiophosphate esters of each of these alcohols; and the lithium, sodium, and potassium salts of each of these alcohols.

For convenience the above exemplifications of various reactions and products of this invention have been discussed primarily in terms of use and formation of polycyclo Grignard reagents. It will be appreciated that the corresponding bis-hydrocarbyl magnesium compounds may be formed and utilized in the same general fashion.

It is also to be understood and appreciated that although various three dimensional molecular structures have been depicted in this description of the invention, it is not intended that the invention be limited to any given geometric or stereo-isomer. The three dimensional formulas have been utilized simply as a convenient way of depicting the complex polycyclic compounds involved in the practice of this invention.

It can readily be seen from the above description that various new and useful compounds are produced according to this invention. For example, this invention provides nortricyclenes having a hydrocarbyl substituent in the 3 position, including those wherein the 5 position is substituted by a functional group such as, for example, a —MgX group and where X is Cl, Br, or I.

Another class of compounds provided by this invention comprises the tricyclo[4.2.1.0$^{2,5}$]non-7-enes having a carbon-bonded substituent in the 3 position. Of these compounds, those in which the substituent is a functional group are of the widest utilities. Exemplary of such functional groups are the —CH$_2$MgX group where X is Cl, Br, or I; the methylol group; esterified methylol groups; the carboxymethyl group and the like.

Still another class of compounds provided by this invention is made up of tricyclo[4.2.1.0$^{2,5}$]nonanes having a carbon-bonded substituent in the 3 position, including those where the substituent is a functional group. Included within this class are compounds wherein the functional substituent in the 3 position is a —CH$_2$MgX group where X is Cl, Br, or I and wherein the 7 or 8 position is substituted by a —MgX group where X is Cl, Br, or I, the other said position being substituted by a 2-alkenyl group.

A further class of novel compounds provided by this invention is composed of 3-(2-alkenyl)bicyclo[2.2.1]heptanes having a functional substituent in the 2 position, e.g., a —MgX group or a hydroxyl group.

Still other novel compounds are included within the foregoing disclosure.

The novel compounds of this invention are of considerable utility. As indicated above, the novel organomagnesium compounds of this invention are especially adapted for use as chemical intermediates in the synthesis of other useful chemicals.

The oxygenated products of this invention (e.g., the alcohols, aldehydes, acids, and esters) may find use as fragrance materials and thus may be used as perfumes in connection with household detergents, shampoos, toilet bars and the like. Some of the products of this invention (e.g., those possessing an allylic substituent) may be utilized as monomers. For example, they may be copolymerized with ethylene in accordance with known Ziegler/ Natta type technology in order to form a variety of polymers of differing physical properties. Various compounds of this invention may also find use in the manufacture of synthetic detergents (e.g., for dishwashing and laundry usage) and in the manufacture of lubricating oil additives. Some of the compounds of this invention may be used directly as, or as intermediates for the manufacture of, flotation chemicals, germicides, insecticides, fungicides, insect repellants, waterproofing agents, plasticizers, and emulsifying agents. In addition, the flammable compounds of this invention may be used as sources of heat, light, carbon dioxide and water.

Other uses for the compounds of this invention will become evident to those skilled in the art.

What is claimed is:

1. A process which comprises reacting a hydrocarbyl magnesium halide with a polycyclic hydrocarbon compound having at least one etheno bridge traversing the bridgehead carbon atoms of an internally strained polycyclic molecule coreactive with the magnesium compound so that intermolecular addition occurs between said compounds.

2. The process of claim 1 wherein said magnesium compound is allyl magnesium bromide or allyl magnesium chloride.

3. The process of claim 1 wherein said magnesium compound is allyl magnesium bromide or allyl magnesium chloride and wherein said polycyclic compound is bicyclo [2.2.1]hepta-2,5-diene.

4. The process of claim 1 wherein said magnesium compound is allyl magnesium bromide or allyl magnesium chloride and wherein said polycyclic compound is bicyclo [2.2.1]hepta-2,5-diene, said compounds being reacted in relative proportions such that intermolecular addition occurs with essentially only one of the etheno bridges of said diene.

5. A process which comprises reacting a hydrocarbyl magnesium halide compound with a polycyclic compound containing at least one etheno bridge coreactive with the magnesium compound to effect intermolecular addition between said compounds, said polycyclic compound having the formula

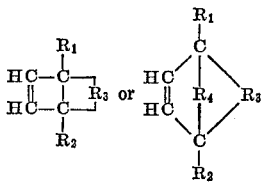

wherein $R_1$ and $R_2$ are hydrogen or lower alkyl groups, $R_3$ is a divalent hydrocarbon group from 1 to 3 carbon atoms in length and containing from 1 to about 18 carbon atoms and $R_4$ is an alkylene or alkenylene group from 1 to 3 carbon atoms in length and containing from 1 to about 18 carbon atoms.

6. The process of claim 5 wherein said magnesium compound is an alkyl Grignard reagent and the reaction is conducted in an ether reaction medium.

7. The process of claim 5 wherein said magnesium compound is allyl magnesium bromide or allyl magnesium chloride and the reaction is conducted in an ether reaction medium.

8. The process of claim 5 wherein said magnesium compound is a 2-alkenyl magnesium compound and the reaction is conducted in an ether reaction medium.

9. The process of claim 1 wherein said polycyclic compound is bicyclo[2.2.1]hepta - 2,5 - diene; bicyclo- [2.2.1]hepta-2,5-diene substituted with one or more lower alkyl groups or lower alkenyl groups or both; bicyclo- [2.2.1]hept-2-ene; bicyclo[2.2.1]hept-2-ene substituted with one or more lower alkyl groups or lower alkenyl groups or both, cyclopentadiene dimer; or cyclopenta- diene dimer substituted with one or more lower alkyl groups or lower alkenyl groups or both.

10. The process of claim 5 wherein said magnesium compound is allyl magnesium bromide or allyl magnesium chloride.

11. The process of claim 5 wherein said magnesium compound is a straight chain primary alkyl magnesium chloride or bromide in which the alkyl group contains up to about 12 carbon atoms.

12. The process of claim 5 wherein said magnesium compound is an alkyl Grignard reagent.

13. The process of claim 5 wherein said magnesium compound is a primary alkyl Grignard reagent.

14. The process of claim 5 wherein said magnesium compound is a secondary alkyl Grignard reagent.

15. The process of claim 5 wherein the reaction is conducted in an ether reaction medium.

16. The process of claim 5 wherein said polycyclic compound has the formula:

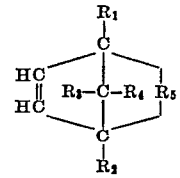

wherein each of $R_1$, $R_2$, $R_3$, and $R_4$ is, individually, hydrogen or an alkyl group and $R_5$ is a divalent hydrocarbon radical from 1 to 3 carbon atoms in length and containing from 1 to about 10 carbon atoms.

17. The process of claim 5 wherein said polycyclic compound is a bicyclo[2.2.1]hept-2-ene.

18. The process of claim 5 wherein said polycyclic compound is a bicyclo[2.2.1]hepta-2,5-diene.

19. The process of claim 5 wherein said polycyclic compound is a dimer of cyclopentadiene or of an alkyl substituted cyclopentadiene.

20. The process of claim 5 wherein said magnesium compound is a 2-alkenyl magnesium halide and said polycyclic compound is a bicyclo[2.2.1]hept-2-ene.

21. The process of claim 5 wherein said magnesium compound is a primary alkyl magnesium halide or a secondary alkyl magnesium halide and said polycyclic compound is a bicyclo[2.2.1]hepta-2,5-diene.

22. The process of claim 5 wherein said magnesium compound is a 2-alkenyl magnesium halide and said polycyclic compound is a bicyclo[2.2.1]hepta-2,5-diene.

23. The process of claim 5 wherein said magnesium compound is allyl magnesium bromide and said polycyclic compound is bicyclo[2.2.1]hept-2-ene and wherein the reaction is conducted in diethyl ether at an elevated temperature.

24. The process of claim 5 wherein said magnesium compound is allyl magnesium bromide and said polycyclic compound is bicyclo[2.2.1]hepta-2,5-diene and wherein said reaction is conducted in diethyl ether at an elevated temperature.

25. The process of claim 5 wherein said magnesium compound is allyl magnesium bromide and said polycyclic compound is cyclopentadiene dimer and wherein the reaction is conducted in diethyl ether at an elevated temperature.

26. The process of claim 5 wherein said magnesium compound is a lower alkyl Grignard reagent and said polycyclic compound is bicyclo[2.2.1]hepta-2,5-diene and wherein the reaction is conducted in diethyl ether at an elevated temperature.

27. The process of claim 5 wherein said magnesium compound is a 2-alkenyl magnesium halide and said polycyclic compound is a bicyclo[2.2.1]hepta-2,5-diene, said compounds being reacted in relative proportions such that intermolecular addition occurs with essentially only one of the etheno bridges of said diene.

28. The process of claim 5 wherein said magnesium compound is a 2-alkenyl magnesium halide and said polycyclic compound is a bicyclo[2.2.1]hepta-2,5-diene, said compounds being reacted in relative proportions such that intermolecular addition occurs with essentially only one of the etheno bridges of said diene; and wherein the reaction is conducted in an ether reaction medium at an elevated temperature.

29. The process of claim 5 wherein said magnesium compound is a 2-alkenyl magnesium halide and said polycyclic compound is a bicyclo[2.2.1]hepta-2,5-diene, said compounds being reacted in relative proportions such that intermolecular addition occurs with essentially both of the etheno bridges of said diene.

30. The process of claim 5 wherein said magnesium compound is a 2-alkenyl magnesium halide and said polycyclic compound is a bicyclo[2.2.1]hepta-2,5-diene, said compounds being reacted in relative proportions such that intermolecular addition occurs with essentially both of the etheno bridges of said diene; and wherein the reaction is conducted in an ether reaction medium at an elevated temperature.

31. An organomagnesium halide selected from the group consisting of
(a) a nortricyclene characterized by having a lower hydrocarbyl substituent in the 3 position and by having the 5 position substituted by a —MgX group where X is Cl, Br, or I, additional substitution in the molecule, if any, being limited to lower alkyl substitution;
(b) a tricyclo[4.2.1.0$^{2,5}$]non-7-ene characterized by having in the 3 position a carbon-bonded substituent of the formula —CH$_2$MgX where X is Cl, Br, or I, additional substitution in the molecule, if any, being limited to lower alkyl substitution;
(c) a tricyclo[4.2.1.0$^{2,5}$]nonane characterized by having the 3 position a carbon-bonded substituent of the formula —CH$_2$MgX where X is Cl, Br, or I and by having the 7 or 8 position substituted by a —MgX group where X is Cl, Br, or I, the other said position being substituted by a lower 2-alkenyl group, additional substitution in the molecule, if any, being limited to lower alkyl substitution;
(d) a 3-(lower 2-alkenyl)bicyclo[2.2.1]heptane characterized by having the 2 position substituted by a —MgX group where X is Cl, Br, or I, additional substitution in the molecule, if any, being limited to lower alkyl substitution; and
(e) a tricyclo[5.2.1.0$^{2,6}$]dec-3-ene characterized by having the 8 or 9 position substituted by a —MgX group where X is Cl, Br, or I, the other said position being substituted by a lower 2-alkenyl group, additional substitution in the molecule, if any, being limited to lower alkyl substitution.

32. A compound according to claim 31 wherein the organomagnesium halide is a nortricyclene as defined in (a) therein.

33. A compound according to claim 31 having the formula:

wherein R is a lower hydrocarbyl group and X is Cl, Br, or I.

34. A compound according to claim 31 wherein the hydrocarbyl group in the 3 position is a primary alkyl group.

35. A compound according to claim 31, viz, 3-ethylnortricyclen-5-yl-magnesium bromide.

36. A compound according to claim 31, viz, 3-ethylnortricyclen-5-yl-magnesium bromide, in an equilibrium mixture with 5-ethylbicyclo[2.2.1]hept-2-en-6-yl magnesium bromide.

37. A compound according to claim 31 wherein the organomagnesium halide is a tricyclo[4.2.1.0$^{2,5}$]non-7-ene as defined in (b) therein.

38. A compound according to claim 31 having the formula:

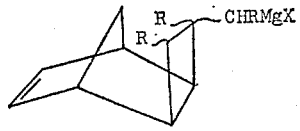

wherein R is hydrogen or a lower hydrocarbyl group and X is Cl, Br, or I.

39. A compound according to claim 31, viz, tricyclo[4.2.1.0$^{2,5}$]non-7-ene having in the 3 position a carbon-bonded substituent of the structure

—CH$_2$MgX where X is Cl, Br, or I.

40. A compound according to claim 31, viz, tricyclo[4.2.1.0$^{2,5}$]non-7-en-3-yl-methylmagnesium bromide.

41. A compound according to claim 31 wherein the organomagnesium halide is a tricyclo[4.2.1.0$^{2,5}$]nonane as defined in (c) therein.

42. A compound according to claim 41 wherein said 2-alkenyl group in the 7 or 8 position is the allyl group.

43. A compound according to claim 41, viz, 7-bromomagnesio-8-allyltricyclo[4.2.1.0$^{2,5}$]non - 3 - yl - methylmagnesium bromide.

44. A compound according to claim 41, viz, 8-bromomagnesio-7-allyltricyclo[4.2.1.0$^{2,5}$]non - 3 - yl - methylmagnesium bromide.

45. A compound according to claim 31 wherein the organomagnesium halide is a 3-(2-alkenyl)bicyclo[2.2.1]heptane as defined in (d) therein.

46. A compound according to claim 45 wherein said 2-alkenyl group is the allyl group.

47. A compound according to claim 45, viz, 3-allylbicyclo[2.2.1]hept-2-yl-magnesium bromide.

48. A compound according to claim 31 wherein the organomagnesium halide is a tricyclo[5.2.1.0$^{2,6}$]dec-3-ene as defined in (e) therein.

49. A compound according to claim 48 wherein said 2-alkenyl group in the 8 or 9 position is the allyl group.

50. A compound according to claim 48, viz, 8-allyltricyclo[5.2.1.0$^{2,6}$]dec-3-en-9-yl-magnesium bromide.

51. A compound according to claim 48, viz, 9-allyltricyclo[5.2.1.0$^{2,6}$]dec-3-en-8-yl-magnesium bromide.

References Cited

UNITED STATES PATENTS 3,418,369   12/1968   Kauer _____ 260—665 G
3,444,199   5/1969    Whitney _____ 260—665 G DANIEL E. WYMAN, Primary Examiner
A. P. DEMERS, Assistant Examiner U.S. Cl. X.R.

260—468 T, 488 R, 514 B, 617 R, 666 A, 666 R

PO-1050
(5/69)

UNITED STATES PATENT OFFICE
CERTIFICATE OF CORRECTION

Patent No. 3,810,949   Dated May 14, 1974

Inventor(s) Lawrence H. Shepherd, Jr.

It is certified that error appears in the above-identified patent and that said Letters Patent are hereby corrected as shown below:

Column 3, line 25, "compound" should read -- compounds --. Column 4, line 37, "[2.2.1[hept-2-ene" should read -- [2.2.1]hept-2-ene --. Column 5, line 27, "each of $R_3$," should read -- each of $R_1$, --. Column 9, line 74, "$[4.2.1.0^{2\cdot 5}]$" should read -- $[4.2.1.0^{2,5}]$ --; line 74, "non-7-ene-3-" should read -- non-7-en-3- --; line 75, "$[4.2.1.0^{2\cdot 5}]$" should read -- $[4.2.1.0^{2,5}]$ --. Column 10, line 35, "$[4.2.1.0^{2\cdot 5}]$" should read -- $[4.2.1.0^{2,5}]$; line 37, "(130 moles)" should read -- (130 mmoles) --. Column 11, line 30, a portion of the right-hand formula is illegible and should read --

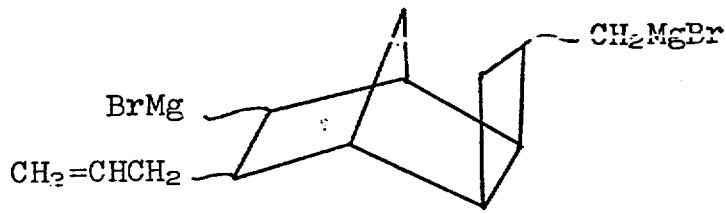

Column 12, line 43, "84-85°C." should read -- 84-84.5°C. --. Column 13, line 63, a portion of the right-hand formula is illegible and should read --

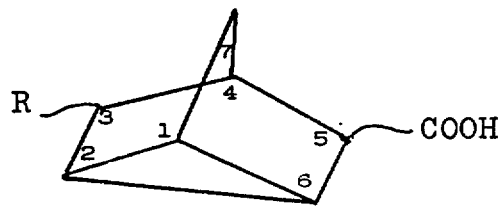

Page 1 of 2 Pages

PO-1050
(5/69)

UNITED STATES PATENT OFFICE
CERTIFICATE OF CORRECTION

Patent No. 3,810,949          Dated May 14, 1974

Inventor(s)     Lawrence H. Shepherd, Jr.

It is certified that error appears in the above-identified patent and that said Letters Patent are hereby corrected as shown below:

Column 14, line 49, "(e.g., PCl $_3$," should read -- (e.g., PCl$_3$, --; line 53, "ot" should read -- to --. Column 15, line 23, "(A(ii)" should read -- A(ii) --; line 50, "non-7-en-3yl-methanol;" should read -- non-7-en-3-yl-methanol; -

Column 18, line 9, "dec-2-en-9-ol" should read -- dec-3-en-9-ol --.

Signed and sealed this 1st day of April 1975.

(SEAL)
Attest:

RUTH C. MASON
Attesting Officer

C. MARSHALL DANN
Commissioner of Patents
and Trademarks